United States Patent [19]
Muhlfeld

[11] 4,061,100
[45] Dec. 6, 1977

[54] CONVERSION KIT FOR A SAILBOAT

[76] Inventor: Frank J. Muhlfeld, Scotch Mist II, North Pier, Thwaites Shipyard, City Island, N.Y. 10464

[21] Appl. No.: 767,848

[22] Filed: Feb. 11, 1977

[51] Int. Cl.² ............................................. B62B 15/00
[52] U.S. Cl. ......................................... 114/43; 280/16
[58] Field of Search ...................... 114/43, 39; 280/16

[56] References Cited

U.S. PATENT DOCUMENTS

| 3,051,503 | 8/1962 | Halperin | 280/16 |
| 3,139,057 | 6/1964 | Black | 114/43 |
| 3,349,741 | 10/1967 | Herbst | 114/43 X |

Primary Examiner—Duane A. Reger
Assistant Examiner—Sherman D. Basinger

Attorney, Agent, or Firm—Bauer, Amer & King

[57] ABSTRACT

There is disclosed a kit for converting a sailboat to a vehicle that is capable of traversing a hard surface such as ice, or the like. The kit includes an elongated spar assembly that is adapted to be transversely mounted on the hull of the sailboat intermediate the ends thereof. The outboard ends of the spar assembly are laterally spaced from the port and starboard sides of the sailboat. The spar assembly is removably secured to the hull of the sailboat and includes first and second surface engaging structures, which may be in the form of blades, mounted on the outboard ends thereof. There is a third surface engaging structure, which may also be in the form of a blade, that is coupled to the tiller of the sailboat beneath the stern end thereof.

16 Claims, 9 Drawing Figures

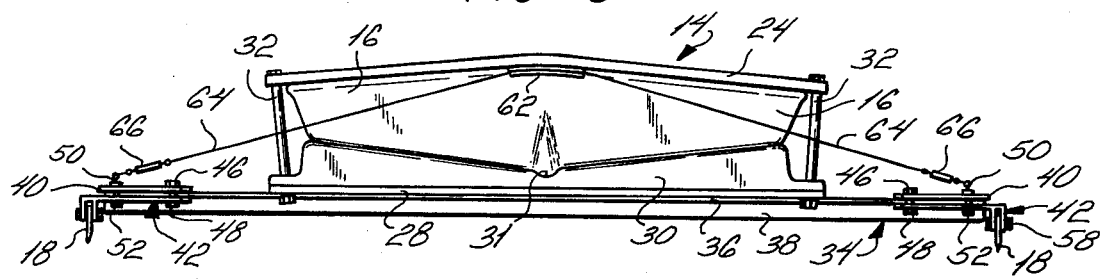
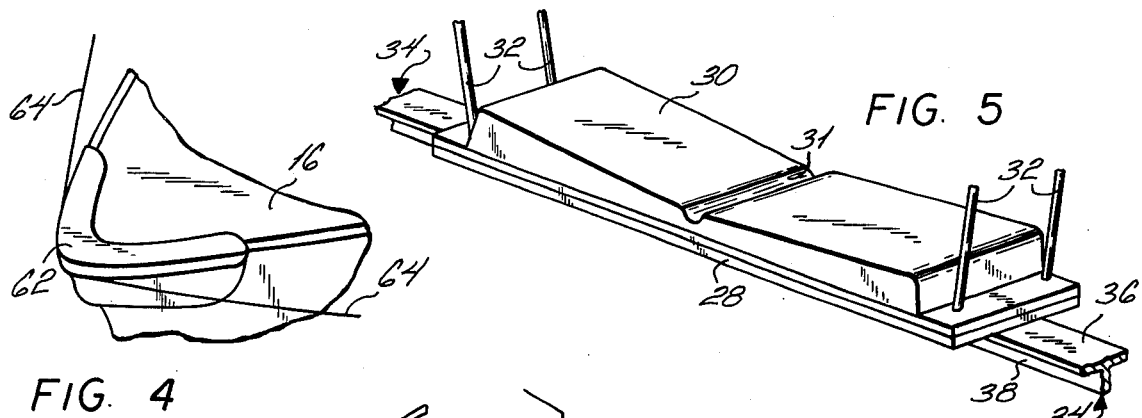
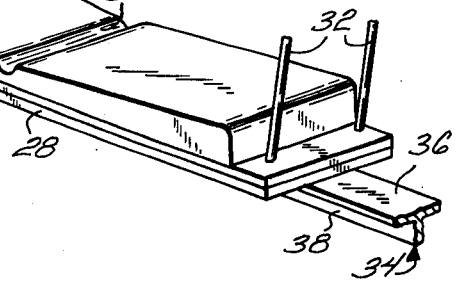
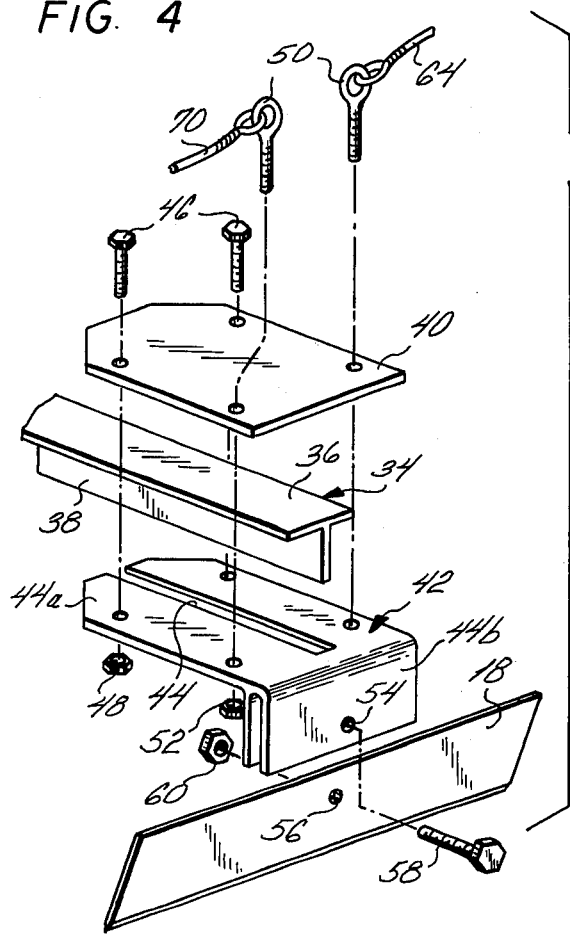
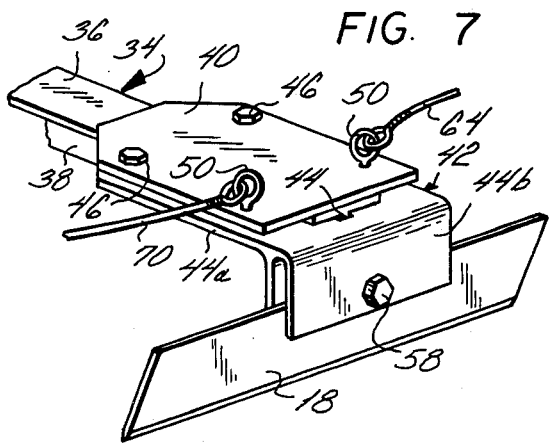

CONVERSION KIT FOR A SAILBOAT

This invention relates generally to conversion kits for sailboats and more particularly to an improved kit for converting a sailboat to an iceboat.

The present invention overcomes many of the shortcomings inherent in prior art structure of this type in that, with the present invention in place, the original sailboat is safe to use on ice. The hull of the sailboat with the conversion kit in place, is heavy enough so as not to leave the ice or to tip over easily in strong gusts of wind. Should the iceboat comprising the sailboat and the conversion kit of this invention be sailed from an ice sheet into open water, the boat will sail without endangering the passengers. The converted sailboat is completely floatable and navigable to some degree in ice-free waters. While it is not necessarily recommended that the iceboat be used under such conditions, it will be appreciated that the ability to be inherently safe on both ice and on water, constitutes an important safety feature.

The conversion kit comprising the present invention may be fabricated for a relatively small fraction of the cost of the sailboat itself and may be installed in existing, small sailing craft such as an Alcort "Sunfish" without in any way modifying the boat itself. No fasteners are driven into the boat and no fittings must be removed from or added to the existing hull. No modification of the sail, mast, boom, etc. is necessary in order to utilize the present invention on a small sailing craft.

In order to provide an attractive, pleasing and functional design, the kit comprising the present invention is made primarily of tempered aluminum and streamline, polished glass fiber impregnated synthetic resin that is molded to conform to the shape of the sailboat. The major pieces comprising the present invention may be readily fastened to the hull of the boat during the fall of the year and may be left in place for the entire winter season. On-site setting up time is therefore equivalent to that for summer sailing. The entire unit can be cartopped in a manner similar to that for a small sailing craft.

It should be particularly noted that the iceboat converted by the present invention is easy to navigate. The only skills that are necessary are those already mastered for sailing on water. Thus, the present invention is particularly desirable for the "weekend" or "family" sailor who constitutes the majority of the owners of small sailing craft such as the "Sunfish".

Accordingly, it is an object of the present invention to provide an improved kit for converting a small sailing craft into an iceboat.

It is another object of the present invention to provide an improved conversion kit, as described above, that may be readily assembled in a minimum time without using special tools and/or skills.

Yet another object of the present invention is to provide an improved conversion kit, as described above, that may be readily cartopped.

A further object of the present invention is to provide an improved conversion kit, as described above, that renders the iceboat inherently safe.

Still another object of the present invention is to provide an improved conversion kit, as described above, wherein the iceboat may be used on a hard surface such as ice and in emergency may also be used in water without removing the conversion kit.

A particular object of the present invention is to provide an improved conversion kit for a sailboat wherein the sailboat may be used on a hard surface such as ice.

Another object of the present invention is to provide an improved conversion kit, as described above, which may readily accept interchangeable blades for use on ice, skis for use on light, hardened snow, and wheels for use on land.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings.

BRIEF DESCRIPTION OF THE DRAWINGS

In the drawings, wherein the same reference numeral denotes the same element throughout the several views:

FIG. 3 is a front elevational view of the structure shown in FIG. 2 but with the sail and mast removed;

FIG. 4 is a fragmentary, perspective view of the bow end of the sailboat illustrating one of the components comprising the present invention;

FIG. 5 is a fragmentary perspective view illustrating another component of the present invention;

FIG. 6 is a fragmentary, exploded view illustrating a portion of one of the assemblies comprising the present invention;

FIG. 7 is a perspective view showing the structure illustrated in FIG. 6 in the assembled condition;

DESCRIPTION OF THE PREFERRED EMBODIMENT

Figure 1:
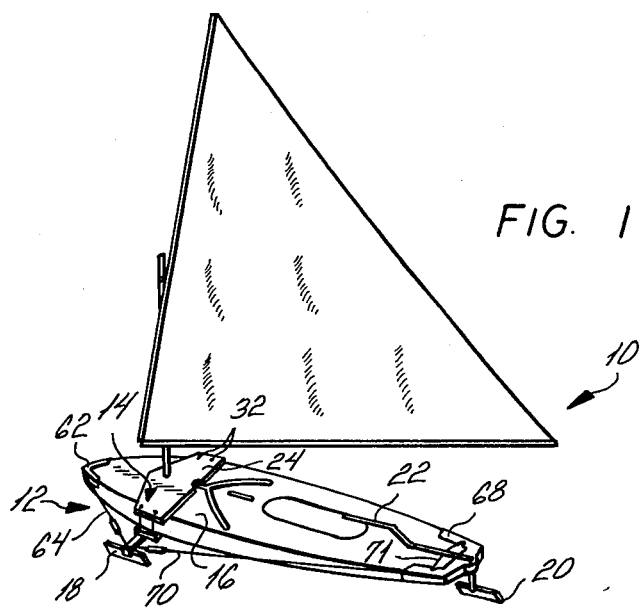
FIG. 1 is a perspective view illustrating the conversion kit comprising the present invention fully assembled on a small sailing craft.

Referring first to FIG. 1, there is shown a sailboat 10 of the Alcort "Sunfish" class with the conversion kit 12 comprising the present invention in place. In its broadest aspect, the present invention comprises an elongated spar assembly generally designated by the reference character 14 which is adapted to be mounted on the hull 16 of the sailboat 10, intermediate the bow and stern ends thereof. The longitudinal axis of the spar assembly 14 is substantially perpendicular to the longitudinal axis of the sailboat 10. In addition, the outboard ends of the spar assembly 14 are laterally spaced from the port and starboard sides of the sailboat 10 and are provided with first and second surface engaging means in the form of blades 18, only one of which is shown in FIG. 1. A third surface engaging means 20, which is also in the form of a blade, is coupled to a tiller assembly 22 and is used for steering purposes.

Figure 2:
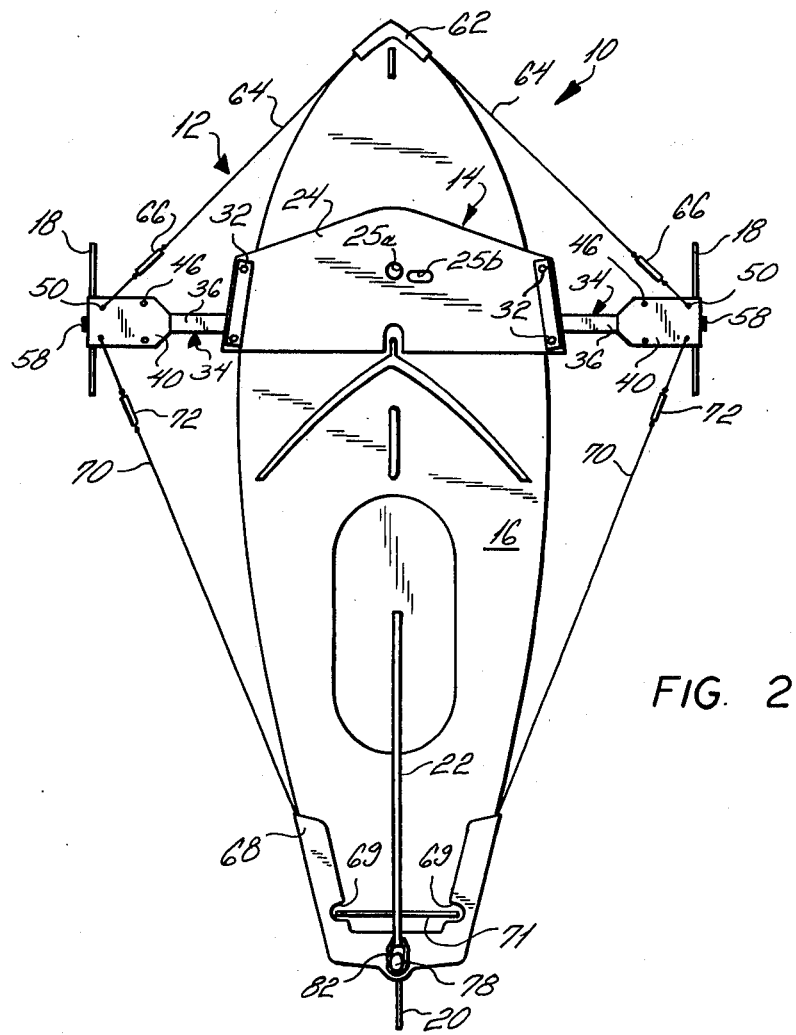
FIG. 2 is a plan view of the conversion kit and sailboat shown in FIG. 1.
Figure 8:
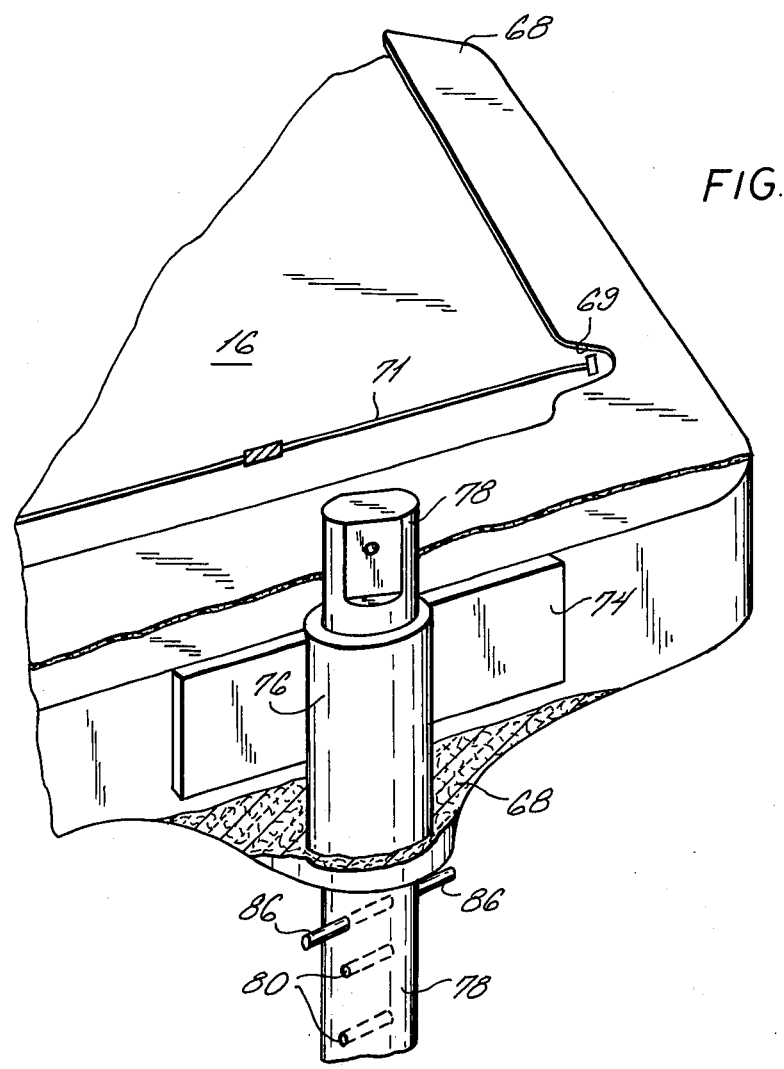
FIG. 8 is a fragmentary perspective view illustrating the stern end of a sailboat with the conversion kit comprising the present invention in place.
Figure 9:
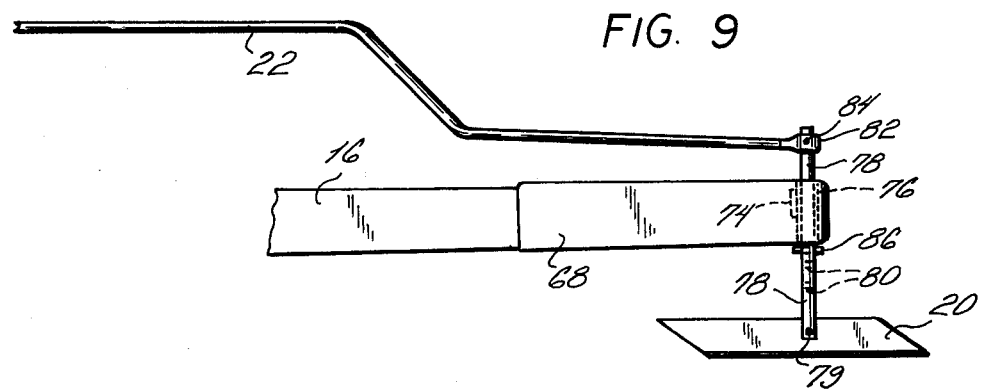
FIG. 9 is a fragmentary side elevational view illustrating the stern end of the sailboat with the conversion kit comprising the present invention in place.

Reference may now be had to FIGS. 2 and 3 for a fuller description of the present invention as well as a complete explanation as to its assembly. Referring first to the spar assembly 14, it will be seen in FIGS. 2 and 3 that it is comprised of a deck plate 24 mounted across the upper surface of the hull and extending laterally therebeyond. The deck plate 24 has a mast opening 25a and a halyard pulley opening 25b. The spar assembly further includes a backing plate 28 which is mounted across the lower surface of the hull and extends laterally therebeyond. Positioned between the lower surface of the hull 16 and the upper, confronting surface of the backing plate 28 is a styrofoam block 30. The deck plate 24, the backing plate 28 and the foamed polystyrene block 30 are clamped in place, as best shown in FIG. 3, by means of four threaded rods 32 utilizing conventional fasteners such as nuts.

The deck plate 24 may be made of marine plywood that is covered with a sheet of fiberglas and molded to fit the contour of the hull deck. The lower surface of the deck plate 24 is preferably sprayed with a soft foam before assembly in order to prevent scratching the hull. The deck plate 24 is intended to absorb the torque and shock of hiking in stiff breezes. The foamed polystyrene or styrofoam block 30 is formed to conform to the lower hull line of the vessel and is also preferably covered with a thin layer of glass fiber. It may include a groove 31 that nests the keel of the boat.

An elongated, T-shaped bar 34 having a horizontal leg 36 and a vertical leg 38, such as shown in FIG. 6, is welded to the underside of the backing plate 28 and extends laterally therebeyond. The blades 18 are secured to the outboard ends of the bar 34 in a manner now to be described. There is provided, at each outboard end of the bar 34, a top plate 40 and an L-shaped bottom plate 42. The top plate 40 is positioned over the top surface of the horizontal leg 36 of the bar 34 and the bottom plate 42, which is provided with a slot 44 in one leg 44a thereof, is arranged to matingly engage the vertical leg 38 and the underside of the horizontal leg 36 of the bar 34. A pair of bolts 46 and a pair of nuts 48 are used to clamp the top plate 40 and the bottom plate 42 to the bar 34. Additional clamping is provided by a pair of eyebolts 50 that pass through the top plate 40 and the bottom plate 42 and which engage nuts 52. An additional function of the eyebolts 50 will be described hereinafter.

It should be particularly noted at this time that the second leg 44b of the bottom plate 42 is also slotted and has an opening 54 therethrough. Similarly, the blade 18 is provided with an opening 56 in order to receive a threaded fastener 58 that is secured in place by means of a nut 60. As is most readily apparent from FIG. 7, the blade 18 is coupled proximate its upper edge to the second leg 44b of the bottom plate 42 proximate the lower edge thereof. Thus, the blade 18 is capable of some slight arcuate movement about the axis of the fastener 58 and can thereby accommodate unevenness in the ice over which it is travelling. It will also be appreciated that because of the slotted arrangement of the horizontal leg 44a of the bottom plate 42, lateral adjustment of the blades 18 is permitted in order to compensate for various ice conditions.

In order to provide greater stability and to ensure proper positioning of the blades 18, port and starboard tension cables are provided. A steel bow cover 62 that is shaped to conform to the prow of the boat 10 is provided with a thin layer of glass fiber and also may have welded thereto a bow tension cable 64, a portion of which is on the port side of the sailing craft 10 while the remainder of which is on the starboard side of the sailing craft 10. The tension cable 64 terminates at the eyebolts 50. In addition, a turnbuckle 66 is provided on the tension cable 64 on both the port side and the starboard side.

A molded glass fiber stern sheath 68 is also provided and has, embedded therein or affixed thereto, stern tension cables 70 with one thereof being on the port side of the sailboat 10 and with the other thereof being on the starboard side. The stern tension cables 70 also terminate at the aft eyebolts 50. A turnbuckle 72 is also provided on each length of the stern tension cables 70. The sheath 68 is molded to snugly encompass the stern of the boat 10 to provide support for the cables 70 and the tiller structure to be described. It is notched at 69 to provide room for the traveller 71 that is attached to the boat hull.

Steering of the iceboat 10 is accomplished by means of the tiller 22 in a conventional manner. The stern sheath 68 has a steel plate 74 molded therein and a steel sleeve 76 is welded to or formed as a part of the plate 74. A steel steering column 78 having a plurality of axially spaced apart transverse holes 80 therein is received in the sleeve 76. The upper end of the steering column 78 is flatted in order to provide means for coupling to the tiller 22. A U-shaped collar 82 and a pin 84 that passes through both the collar 82 and the upper end of the steering column 78 are used for this purpose with the collar 82 being welded or otherwise suitably secured to the tiller 22.

The alternative openings 80 in the steering column 78 are provided to compensate for differences in wind and ice conditions. The blade 20 is pivotally mounted on the column 78 at bolt 79. The stern blade 20 is assembled to the column and the stern is lifted up and the steering column 78 is then inserted in the sleeve 76. The stern is then lowered until the sleeve 76 rests on a pin 86 which has been inserted into the proper hole 80 in accordance with the particular ice and wind conditions. The tiller 22 may then be assembled to the upper end of the steering column 78 by means of the collar 82 and pin 84 described hereinabove.

From the foregoing it will be appreciated that an improved kit for converting a single hull, small sailing craft to an iceboat has been provided. The present invention is easily installed and does not require any fasteners to be engaged in the hull or any other part of the boat itself. No fittings must be removed from or added to the existing hull and no modification of the sail, mast, boom, etc. is necessary. The present invention may be readily assembled in a minimum of time which is a substantial advantage since it will be recognized that the structure disclosed herein will be used primarily in cold weather. The bow cover, together with the stern sheath and the tensioning cables and their turnbuckles described hereinabove, assure that the spar assembly will be rigidly held in place. Spacer means may be utilized between the stern sheath and the hull and between the spar assembly and the hull in order to accommodate single hull sailboats having slightly different shapes, for example, the well known "Laser" boat.

While there have been shown and described and pointed out the fundamental novel features of the invention as applied to a preferred embodiment thereof, it will be understood that various omissions and substitutions and changes in the form and details of the device illustrated, and in its operation, may be made by those skilled in the art without departing from the spirit of the invention. It is the invention, therefore, to be limited only as indicated by the scope of the claims appended hereto.

What is claimed is:

1. A kit for converting a sailboat to a vehicle capable of traversing a hard surface such as ice or the like, said kit comprising, an elongated spar assembly adapted to be removably mounted on the hull of the sailboat intermediate the bow and stern ends thereof with the longitudinal axis of the spar assembly being substantially perpendicular to the longitudinal axis of the sailboat and with the outboard ends of said spar assembly being laterally spaced from the port and starboard sides of the sailboat, said spar assembly including a deck plate mounted across the upper surface of the hull and extending laterally therebeyond, a backing plate mounted across the lower surface of the hull and extending laterally therebeyond and fastener means for coupling the extending ends of said deck plate and said backing plate to each other whereby said spar assembly may be removably secured to the hull of the sailboat;

first and second surface engaging means mounted on said spar assembly proximate the outboard ends thereof; and third surface engaging means adapted to be coupled to the tiller of the sailboat beneath the stern end thereof.

2. A kit according to claim 1 wherein there is further provided a block positioned intermediate the lower surface of the hull and the surface of said backing plate that is in confronting opposition thereto.

3. A kit according to claim 2 wherein the portion of said block that is in opposition with the hull is shaped to conform thereto.

4. A kit according to claim 2 wherein said block is made of styrofoam and includes a covering layer of glass fibers.

5. The kit according to claim 1 wherein said spar assembly further includes an elongated bar rigidly secured to said backing plate and said first and said second surface engaging means are coupled, respectively, proximate the outboard ends of said bar.

6. The kit according to claim 5 wherein said first, said second and said third surface engaging means are blades and wherein there is further included first and second clamping means for removably coupling said first and said second blades to said bar.

7. A kit according to claim 6 wherein said bar is T-shaped having a vertical leg and a horizontal leg and wherein said first and said second clamping means each comprise a top plate positioned on said horizontal leg of said bar and an L-shaped bottom plate having a first leg that includes a slot for receiving said vertical leg of said bar and a second leg that includes means for mounting said blade thereto.

8. A kit according to claim 7 wherein each said first and second blade and said second leg of each said bottom plate include cooperating openings therein and wherein said mounting means for each said blade comprises a pivot pin extending through the said blade and said second leg of each said bottom plate whereby said blade is permitted some limited angular displacement about the axis of said pivot pin.

9. A kit according to claim 8 wherein said second leg of said bottom plate is defined by two spaced apart sections and said blade is positioned therebetween whereby angular displacement of said blade is limited by said first leg of said bottom plate.

10. A kit according to claim 1 wherein there is further included a bow cover, a stern sheath and tensioning cables extending between said bow cover and said spar assembly and between said stern sheath and said spar assembly on the port and starboard sides of the vehicle.

11. A kit according to claim 10 wherein means are included for varying the force exerted by said tensioning cables.

12. A kit according to claim 1 wherein coupling means are included for adjustably positioning said third surface engaging means with respect to the hull.

13. A kit according to claim 12 wherein said coupling means comprises an elongated steering column having one end thereof coupled to the tiller and the other end thereof coupled to said third surface engaging means, said steering column including a plurality of axially spaced apart holes therein, there being further included a pin selectively positioned in one of said holes and arranged to support the stern end of the vessel whereby the space between said third surface engaging means and the stern of the vessel may be varied depending upon which of said holes is selected.

14. In a kit for converting a sailboat to an ice sailboat, a plurality of ice surface engaging means, a spar assembly for mounting to the hull of a sailboat intermediate the bow and stern and for extending beyond the sides of the hull for supporting one of said ice surface engaging means below and on the port and starboard sides of the hull, a stern member for mounting to the stern of the hull of the sailboat and supporting another of said ice surface engaging means at and below the stern of the hull, a bow member for mounting in the bow of the hull of the sailboat, and cables for connecting between said spar assembly and said bow member and said stern member to secure said spar assembly, bow member and stern members to the sailboat hull.

15. In a kit as in claim 14, said spar assembly having an opening defined therein to accommodate the mast of the sailboat therethrough when the same is mounted to a sailboat hull.

16. In a kit as in claim 15, said spar assembly including upper and lower members each for mounting to the upper and lower surfaces of a hull of a sailboat, and means to releasably fasten the same together to the hull of a sailboat.

* * * * *